Jan. 20, 1970 E. H. IRASEK 3,490,587

RANDOM ACCESS STORAGE AND RETRIEVAL DEVICE WITH ACTIVITY ORIENTATION

Filed Jan. 30, 1967 5 Sheets-Sheet 1

INVENTOR.
EUGENE H. IRASEK
BY Fulwider, Patton, Rieber, Lee, and Utecht
ATTORNEYS INVENTOR.
EUGENE H. IRASEK
BY Fulwider, Patton, Rieber Lee, and Utecht
ATTORNEYS INVENTOR.
EUGENE H. IRASEK
BY Fulwider, Patton, Rieber, Lee, and Utecht
ATTORNEYS INVENTOR.
EUGENE H. IRASEK
BY Fulwider, Patton, Rieber, Lee, and Utecht
ATTORNEYS INVENTOR.
EUGENE H. IRASEK
BY Fulwider, Patton, Rieber, Lee, and Utecht
ATTORNEYS United States Patent Office 3,490,587

Patented Jan. 20, 1970

3,490,587

RANDOM ACCESS STORAGE AND RETRIEVAL DEVICE WITH ACTIVITY ORIENTATION

Eugene H. Irasek, Inglewood, Calif., assignor, by mesne assignments, to HF Image Systems, Inc., Los Angeles, Calif., a corporation of California Filed Jan. 30, 1967, Ser. No. 612,468
Int. Cl. B07c 3/10
U.S. Cl. 209—80.5 20 Claims

ABSTRACT OF THE DISCLOSURE

A random access storage and retrieval device for a large number of items, such as cards and the like, in which the items are individually identifiable, are located in random positions and may be recalled independently of other items and in any desired order regardless of their location in the store. Items recalled with greater frequency are automatically grouped together in the store as the device is used, and the grouped items are investigated first for the identification of an addressed item.

CROSS-REFERENCE TO RELATED APPLICATION

The disclosure herein incorporates features disclosed and claimed in applicant's copending application Ser. No. 528,231, filed Feb. 17, 1966, now U.S. Patent No. 3,429,436, for Random Access Storage and Retrieval Device.

BACKGROUND OF THE INVENTION (1) The present invention is directed to a random access storage and retrieval device for a large number of items such as cards or the like, which items are individually identifiable and may be located randomly in the store without regard to their positions relative to other items. The device includes means for addressing a desired item and automatically selecting the addressed item and removing the selected item from the store.

(2) In applicant's copending application above-identified, selected items are returned to the store, after manipulation, at the same location therein from which they were removed so that the items maintain the same relation with respect to the other items in the store which they originally had, even though the original relation may have been random.

In most installations, some of the cards will be recalled from the store with greater frequency than others and in previous arrangements the same average operating time is required to recall a card regardless of the frequency with which it is recalled. It is the purpose of the present invention, among others, to lessen the recall time for the more frequently recalled items by grouping these more active cards together in a particular section of the store and investigating this section of the store first to see if an addressed card can be identified therein. With this printed location and investigation, the time involved in retrieving each of the more frequently recalled items from the store is reduced and there is a considerable saving in the overall operating time of the device.

SUMMARY OF THE INVENTION

For ease in terminology in describing the present invention, the items to be stored are referred to generally as "cards," which term is intended to cover many different types of items including, without limitation, ledger cards, magnetic cards, optical cards, punch cards, tapes, keys, slides, film cards, microfiche, microfilm jackets and the like, one specific example being a film sheet "card" carrying as many as one-hundred or more individual film images or the like thereon.

As described in applicant's copending application above-identified, an individual card to be recalled from the store is addressed by its unique notch coding, is identified in a selector, is stopped by a sensor in a delivery station, and is thereafter manipulated by an X–Y positioning mechanism or other handling means and the card is returned to the store in the same relative position which it occupied before its removal. According to the present invention, cards removed from the store are returned to the store at a same predetermined location in the store so that the more frequently used cards tend to accumulate adjacent to the predetermined return position and the more active cards are therefore oriented or grouped together at this predetermined position in the store. When a less frequently recalled card is addressed and removed from the store, it will be returned into the location of the activity-oriented cards but will gradually be moved back out of the frequently used group as the more frequently used cards are placed ahead of it in the store. The selector and the return position on the store are automatically located so that the selector initially investigates the activity-oriented group of cards in an attempt to locate and identify an addressed card therein and thereby speed up the selection when a more frequently recalled card is addressed.

It is then a primary object of the present invention to provide an improved random access storage and retrieval device wherein the more frequently recalled cards may be more quickly located and withdrawn from the store. One manner of achieving this object is to group the more frequently recalled cards together at a predetermined location within the store and to investigate the grouped cards first in an attempt to identify an addressed card as located therein. One preferred manner of securing the grouping is to return withdrawn cards back into the store at the same predetermined location therein so that the more frequently recalled cards tend to orient themselves adjacent the location in the store at which they are returned thereto. To quickly investigate the activity-oriented group of cards, the store and the selector mechanism are automatically relatively positioned to locate the activity-oriented group just downstream of the selector so that initial relative movement between the selector and the store immediately investigates the activity-oriented group of cards for the quick selection of an addressed card if it is one of the frequently recalled cards located in the activity-oriented group. The store is next located with respect to a delivery and return station so that the previous selected card is returned to the store at the predetermined return point regardless of the location in the store from which the card had been withdrawn. After the return of the previously selected card, the recently selected card is placed at the station in a withdrawal position and withdrawn from the store which then moves to relocate the activity-oriented group of cards just downstream of the card selector.

By the above arrangement the time involved in selecting and withdrawing from the store those cards which are most frequently recalled is substantially reduced and the accumulated saving in operating time is material. While the inventive concept is shown in a preferred embodiment incorporating features described and claimed in applicant's copending application, it will be understood that the basic concept and the application thereof to random access storage and retrieval devices may assume different structural embodiments within the scope of the invention which lies in the more general concept of the objects and features hereinbefore pointed out and others which will be apparent to those skilled in the art from the following specification and the appended drawings.

DESCRIPTION OF THE PREFERRED EMBODIMENT

Figure 2:
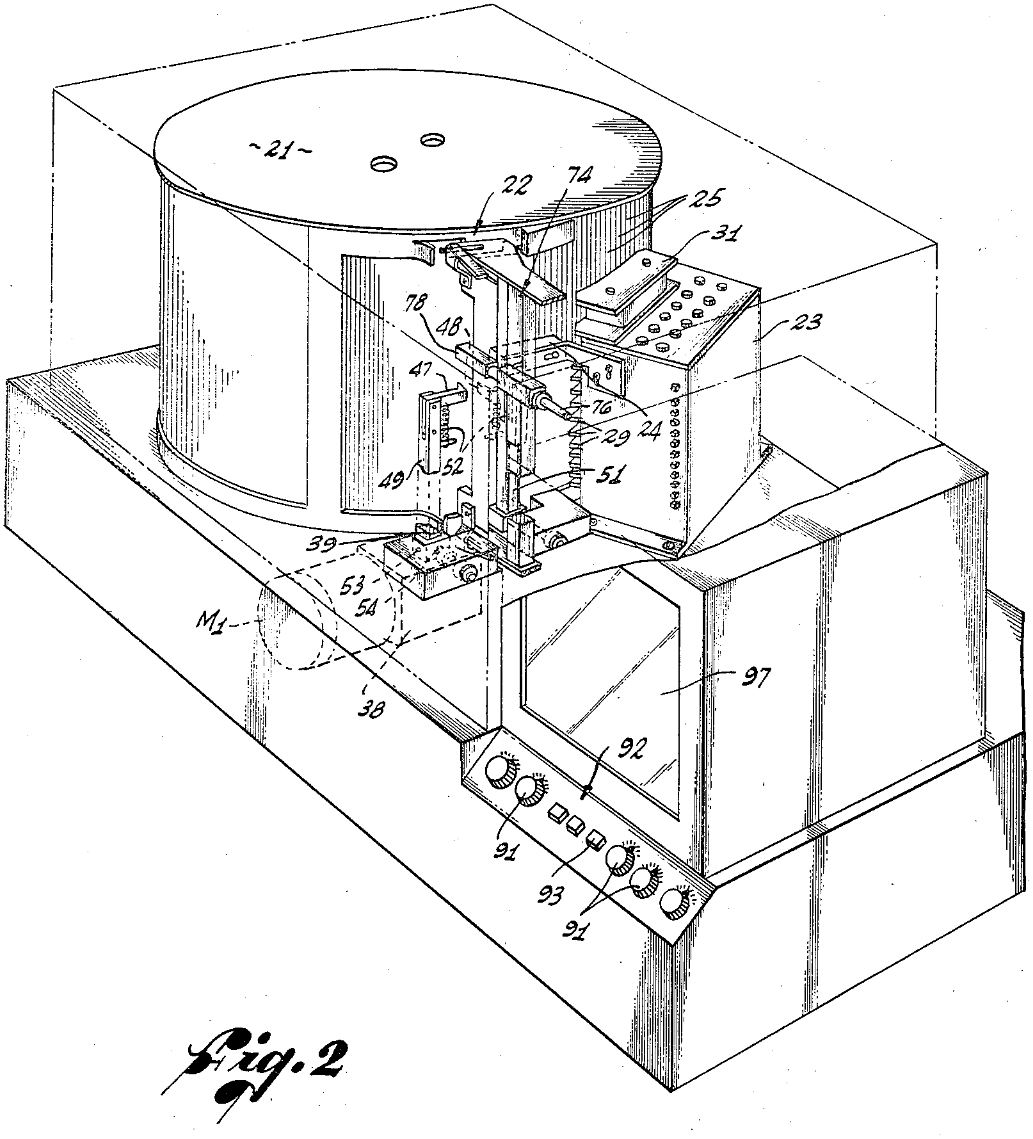
FIGURE 2 is a perspective view with parts broken away of a preferred embodiment of the device according to the present invention.
Figure 11:
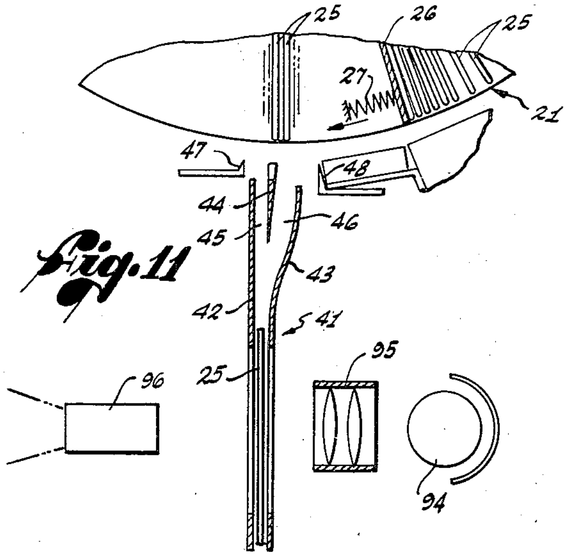
FIGURES 11 and 12 show the positions and movements of the elements of FIGURE 4 in the return of a card to the store.
Figure 12:
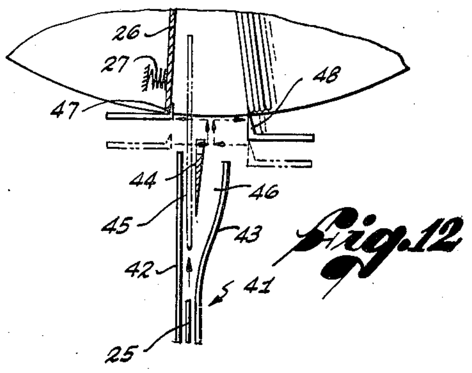

Referring principally to FIGURE 2, the card items 25 are stored substantially radially within a rotatable cylindrical drum 21 and access is had to the card edges around the periphery of the drum, with the cards removed from and returned to the drum store at a station indicated generally at 22. The drum 21 rotates in a clockwise direction only, as viewed in FIGURE 2, and adjacent its periphery a card addressing and selecting device 23 is located in advance or "upstream" of the delivery and return station 22. A card sensor 24 is located between the selector device 23 and the station 22. The radially extending cards 25 are located within the drum 21 between stationary and movable backup plates mounted therein and also extending radially thereof, and of which a movable backup plate 26 is shown biased by a spring 27 in a counterclockwise direction (FIGURES 11 and 12).

The forward edges of the cards 25 are of magnetic material at 28 and are provided with forwardly opening coding notches which identify each of the cards uniquely, as explained in the above-identified copending application. The addressing and selecting device 23 concludes a plurality of pivoted address plates 29, the upper and lower positions of which correspond to digital numbers 0 and 1 to address by their positions a unique card 25 within the drum 21. The edges of the address plates 29 cooperate with the coding notches in the forward edges of the cards to permit an addressed card to be selected and partially withdrawn from the drum store by means of arcuate, nonconcentric magnets 31. The selector 23 is provided with an arm 32 operated by a solenoid 33 (FIGURE 15) for holding the cards 25 within the drum while the address plates 29 are changing positions.

Figure 14:
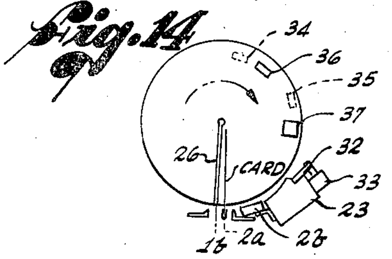
FIGURE 14 is a diagrammatic representation of another relative position of the store relative to the card selector and the delivery station.
Figure 15:
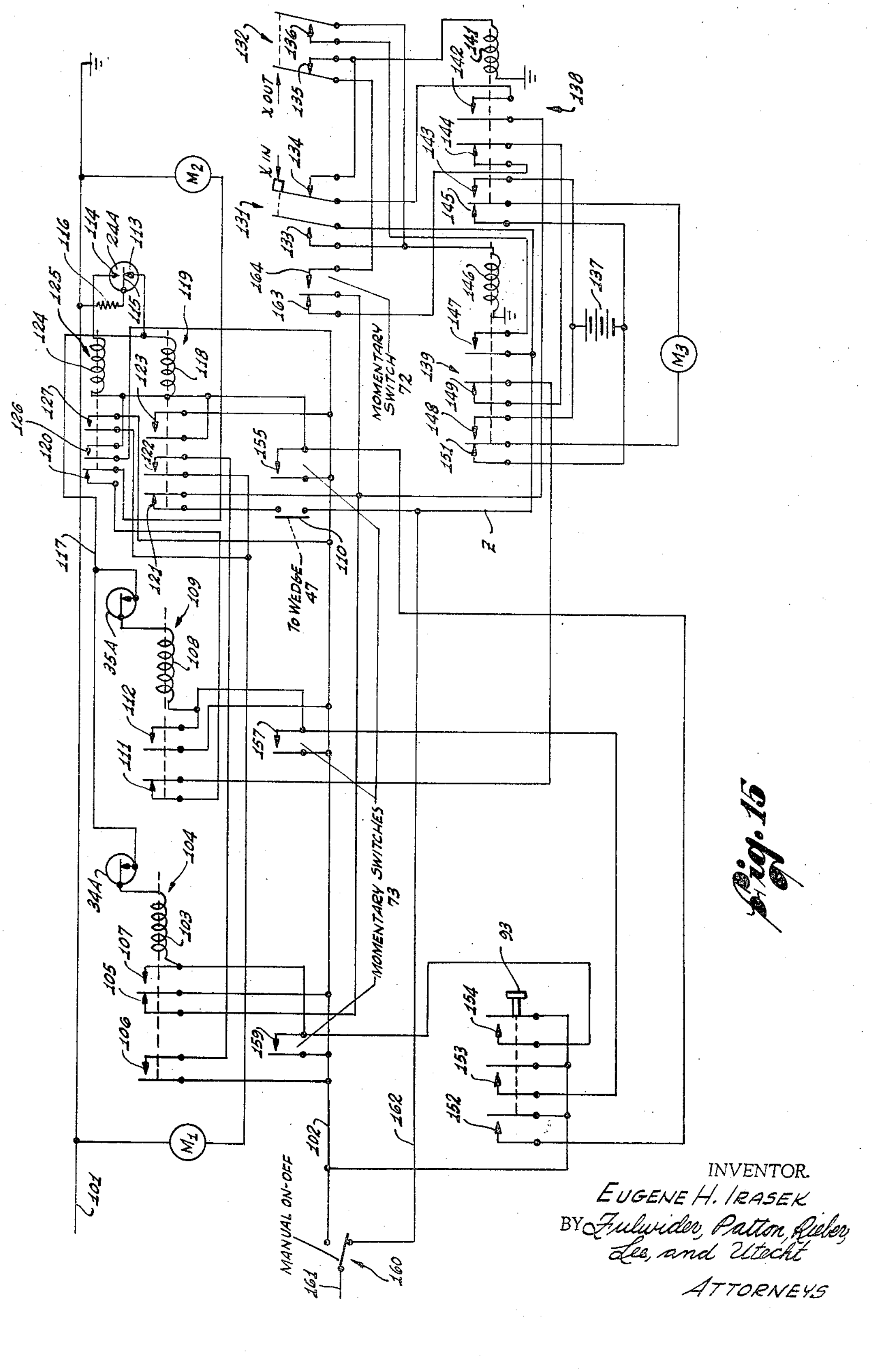
FIGURE 15 is a schematic wiring diagram for the operation of the device according to the present invention.

A card selected by the device 23 and partially withdrawn from the drum store by the magnets 31 is detected by the sensor 24, which is responsive to the magnetic material 28 of the card edge, to operate a double-throw reed switch or the like 24A. A pair of magnetically-responsive sensors 34 and 35 are placed beneath the drum 21 and a pair of magnetic slugs 36 and 37 are mounted on the drum 21, the under surface of the presence of the slug 36 being detected only by a sensor 34 while the presence of the magnetic slug 37 is detected by both sensors 34 and 35 (FIGURES 14 and 15). Sensor 34 controls the operation of a normally closed switch 34A and sensor 35 controls the operation of a normally closed switch 35A (FIGURE 15).

The drum 21 is driven by a motor M1, in a clockwise direction as shown in FIGURE 2, through a gear box 38 and a shaft 39 on which the drum is mounted.

Figure 13:
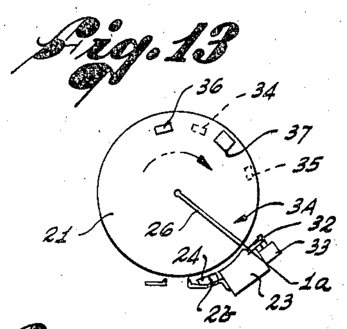
FIGURE 13 is a schematic representation of the position of the store relative to the selector prior to the selection of a card from the store.

At the station 22 is located a gate 41 having a straight wall 42 and a curved wall 43 separated adjacent the drum 21 by a generally wedge-shaped strip 44 which divides the gate 41 thereat into a card return passage 45 and a card withdrawal passage 46. At opposite sides of the gate 41 are mounted card-manipulating wedges 47 and 48, the wedge 47 being elongated to permit the location of a partially withdrawn card adjacent thereto as shown in FIGURE 13. The wedges 47 and 48 are pivotally mounted at the ends of vertical arms 49 and 51 and are normally held in substantially the positions shown in FIGURE 4 by biasing springs 52. They are freely movable through notches in walls 42 and 43 and strip 44.

Figure 3:
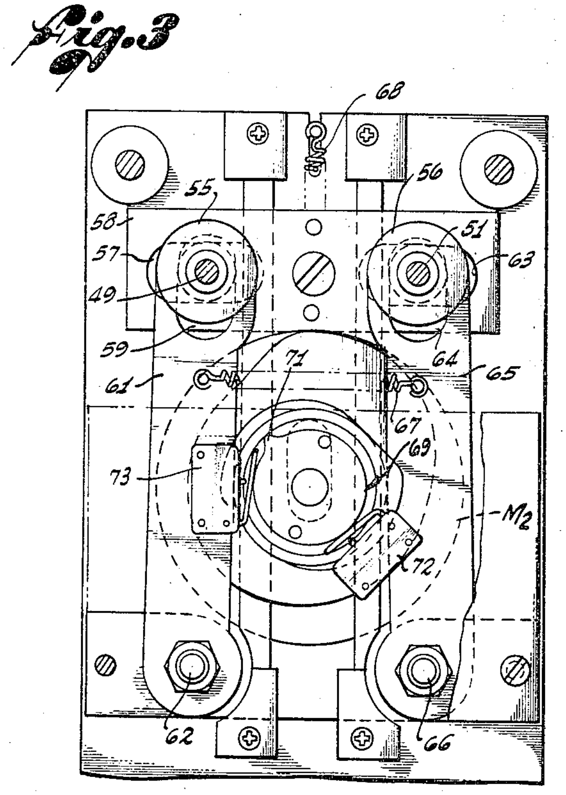
FIGURE 3 is a bottom plan view of operating mechanism for card-separating elements at the delivery station.

Each of the arms 49, 51 is mounted for universal swivelling movement about pivot axes 53 and 54. The lower ends of the arms 49, 51 are mounted in spool-like members 55, 56, respectively. Member 55 is mounted in elongated slots, 57 in a rectilinearly movable bar 58, and 59 adjacent the end of an arm 61 pivoted at 62. Member 56 is mounted in elongated slots, 63 in the bar 58 and 64 adjacent the end of an arm 65 pivoted at 66. The arms 61 and 65 are biased toward each other by a spring 67 and the bar 58 is biased downwardly by a spring 68, as viewed in FIGURE 3. A common group of cams indicated generally at 69 are rotated by a motor M2 and have cam surfaces cooperating with the edges of the pivoted arms 61, 65 and the bar 58 so as to effect movements of the arms and the bar against their biases, as explained in applicant's above-identified copending application, to the members 55 and 56 and rotate arms 49 and 51 to effect the movements of the wedges 47, 48 indicated by the arrows numbered 1 through 5 in FIGURE 4.

The cam group 69 includes a switch-operating projection 71 rotating therewith and operating in sequence a pair of angularly spaced switches 72 and 73.

At the card-delivery and return station 22 is a card-manipulating mechanism indicated generally by the numeral 74. It comprises a vertical bar 75 mounted for horizontal movement by a lost motion connection to a rod 76 through suitable mechanical structure whose details are not important to the present invention and which is driven in opposite horizontal or X directions by a motor M3. The rod 76 extends through the bar 75 and has a limited lost motion connection thereto between a shoulder 77 at the back of a card pusher head 78 and disk 79 rigidly mounted on the rod 76.

The cards 25 have upper and lower edge extensions 81 adapted to be engaged by hook ends 82 directed downwardly and upwardly from the ends of resilient arms 83 mounted at the top and bottom of the vertical bar 75. Each arm 83 has a horizontal pin 84 secured thereto adjacent its end, which pins 84 cooperate with small cam plates 85 as the bar 75 moves inwardly toward the drum 21 to move the hook ends 82 vertically beyond the card extensions 81 to snap therebehind, in the position of FIGURE 5, as the pins pass the inward ends of the cam plates. The cam plates 85 are stationarily mounted as at 86 on the gate wall 42 and permit the pins 84 to move freely thereunder in the outward, card-withdrawing movement of the bar 75 and arms 83.

The address plates 29 may be positioned by solenoids, as disclosed in applicant's copending application, under the control of rotary switches 91. Push button switches 92 may control power, light, and solenoid 33. An operation start push button switch is designated 93.

A selected card withdrawn from the drum 21 by card manipulator 74 may be moved in both horizontal and vertical directions by a conventional X–Y mechanism, not shown, to place the proper image on the card in the optical path of light 94 and lens system 95, 96 to project the image upon a screen 97 for a readout of the image material. The particular readout forms no part of the present invention and can include any means to retrieve information or the like from the particular items being stored.

Referring to FIGURE 15, power for the system is supplied across ground line 101 and hot line 102. Sensor switch 34A controls the operating coil 103 of a relay 104 having a normally closed contact 105 and normally open contacts 106 and 107. Sensor switch 35A controls the operating coil 108 of a relay 109 having a normally closed contact 111 and a normally open contact 112. Sensor switch 24A has a normally closed contact 113, a normally open contact 114, and a movable contact 115 connected through a limiting resistor 116 to ground line 101. Contact 113 is connect to a line 117 leading to switches 34A and 35A and to the operating coil 118 of a relay 119 having a normally closed contact 121 and normally open contacts 122 and 123. Normally open contact 114 of switch 24A is connected to the operating coil 124 of a relay 125 having a normally closed contact 120 and a normally open contact 127, as well as a normally open holding circuit contact 126.

In series with contact 121 is a normally open mechanical limit switch 110 operated to closed position by wedge 47 when the wedges are inward and separated.

A pair of multipole limit switches 131 and 132 are operated by the card manipulator 74 in its opposite extremes of movement, the limit switch 131 being operated by the card manipulator 74 at its innermost position towards the drum 21, and the limit switch 132 being operated in the outer position of the card manipulator remote from the drum 21. The limit switches 131 and 132 are both shown in the positions they assume when the card manipulator 74 is in its outward position remote from the drum 21. For limit switch 132 this closes contact 135 and opens contact 136. In limit switch 131 contact 133 is opened and contact 134 closed when the card manipulator starts its outward movement.

The card manipulator 74 is driven in opposite horizontal directions by a D.C. motor M3 powered by a battery source 137 for simplicity of reversal of the direction of rotation of the motor. A pair of relays 138 and 139 are associated with the motor M3, the relay 138 having an operating coil 141 connected at one side to ground and at the other side to contacts 134 and 135. Relay 138 has normally open contacts 142 and 143 and normally closed contacts 144 and 145. Relay 139 has an operating coil 146 having one side connected to ground and the other side connected to contact 133 and the movable contact engaging contact 136. Relay 139 has normally open contacts 147 and 148 and normally closed contacts 149, 151.

Starting push button switch 93 has three normally open contacts 152–154 connected in parallel to the hot line 102. Contact 152 is connected to operating coil 118 of relay 119, to the normally open contact 155 on switch 73, and to the movable contact engaging contact 123. Contact 153 is connected to the operating coil 108 of relay 109, to the normally open contact 157 of switch 73 and to contact 127. Contact 154 is connected to operating coil 103 of relay 104, to contact 107 and to the normally open contact 159 of switch 73.

Switch 72, operated by cam group projection 71 has a normally closed contact 163 and a normally open contact 164. Both switches 72 and 73 are momentarily operated by the projection 71 which passes each switch operator before the motor M2 and cam group 69 stop.

A manual double-throw switch 160 connects power supply line 161 to hot line 102 in one position and to a line 62 in its other position, switch 160 being operated only at the beginning and end of an overall period of operation of the device.

OPERATION

This description of operation starts with no card withdrawn from the drum store and with the card manipulator 74 in its outer position. Switch 160 is operated to connect the power line 161 to the hot line 102 and the initial operation of the device enters the operation flow chart of FIGURE 1 immediately ahead of operational block 172.

To select the first card, the solenoid 33 is energized so that the arm 32 will hold the cards in place in the drum opposite the device 23. The solenoids actuating the address plates 29 are selectively energized by switches 91 to move the plates 29 into coded positions uniquely addressing a single card within the drum in correspondence with the coding notches in its forward edge. With the address thus entered into the addressing and selecting device 23, the solenoid 33 is deenergized and start push button switch 93 is depressed to momentarily close contacts 152–154 and start operation of the device. This completes operational block 172 of FIGURE 1.

Closing of contact 154 energizes the operating coil 103 of relay 104 through sensor switch 34A, the normally closed contact 113 of sensor switch 24A and limiting resistor 116 to the ground line 101. Closing of contact 153 energizes the operating coil 108 of relay 109 through snesor switch 35A and contact 113 of sensor switch 24A. Closing of contact 152 energizes the operating coil 118 of relay 119 through contact 113 of sensor switch 24A. All of relays 104, 109 and 119 therefore close to operate their contacts to position the reverse of those shown. Contacts 107, 112 and 123 close holding circuits about contacts 152–154 for the operating coils of their respective relays.

Closing of contacts 106 and 122 establishes a circuit for motor M1 across lines 101 and 102 and motor M1 rotates the drum 21 to move the card edges 28 past the selector device 23, an addressed card being now free to be pulled partially outwardly by magnets 31, its coding edge notches receiving the edges of address plates 29. The drum 21 starts its rotation from the position until the magnetic slugs 36, 37 simultaneously operate on sensors 34 and 35 to open switches 34A and 35A, thus deenergizing operating coils 103 and 108 and dropping out relays 104 and 109. Dropping out of relay 104 opens contact 106 and deenergizes motor M1 which thereby stops the drum 21 in the position of FIGURE 14 with the backup plate 26 at location 16 adjacent the delivery and return station 22 and the gate 41. This completes operational block 173 in FIGURE 1.

With the dropout of relays 104 and 109, motor M2 is energized through normally closed contacts 120, 111, 149, 144, 163, and 105 to the line 102. Rotation of motor M2 rotates the cam group 69 to move the bar 58 and pivoted arms 61, 65, thereby rotating arms 49 and 51 to effect movement of the card-separating wedges 47 and 48. The wedges first move in the direction of arrows 1 and 2 in FIGURE 4 to come together and then move forwardly to enter the drum store just ahead of the backup plate 26. The wedges 47 and 48 then separate in the directions of arrows 4 in FIGURE 4 to open a space between the backup plate 26 and the adjacent cards, as shown in FIGURE 12, this both moving the backup plate against the spring 27 and compacting the adjacent cards in the opposite direction. Wedge 47 in this inner, separated position closes limit switch contacts 110.

At this time the projection 71, rotating with the cam group 69, operates switch 72 to momentarily open contact 163 and close contact 164. Opening of contact 163 opens the circuit to motor M2 which is braked to a stop but with sufficient motion to permit switch 72 to return to its normal, illustrated position. This completes operational block 173A.

Closing of contact 164 energizes the operating coil 141 of relay 136 through the contact 135 of limit switch 132. Relay 138 pulls in and closes contact 142 to establish a holding circuit for its operating coil 144. Closing of contact 143 establishes a circuit for motor M3 from the battery source 137 to rotate the motor M3 in a direction to move the card manipulator 74 inwardly toward the drum 21 by means of the rod 76. As the card manipulator starts its inward movement, limit switch 132 reverses the positions of its contacts from the operated positions of FIGURE 15. If at this time there were a card in the gate 41, as shown in FIGURE 12, it would, in accordance with operational block 174, be pushed through the channel 45 into the drum store between the wedges 47 and 48 by means of the head 78 on the rod 76. As the card manipulator 74 moves inwardly, the pins 84 on the arms 83 ride on the cam plates 85 to move the end hooks 82 beyond projections 81 on any card which may have been selected and located at card position 2*a* when the plate 26 stopped at 1*b*, FIGURE 14. Due to the lost motion between the shoulder 77 and the disk 79 the manipulator bar 75 follows the head 78 at some distance so that the forward end of the head is at the drum periphery before the pins 84 snap beyond the cam plates 85 to move the end hooks behind the positions of the extensions 81 on a partially withdrawn, selected card.

At the inner position of the card manipulator 74 the limit switch 131 is operated to open contact 134 and close contact 133, opening of contact 134 deenergizing operating coil 141 of relay 138 which drops out. This completes operational block 174 in the diagram of FIGURE 1.

Figure 10:
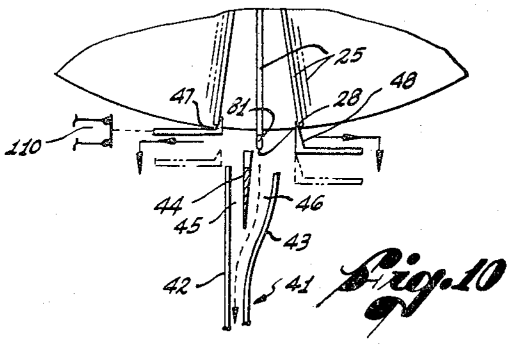

The next operation depends on the possibility of a card having been selected and partially removed from the drum store by the selector device 23. Taking first the condition in which there is a card at the point 2*a* of FIGURE 14, that is, between the wedges 47 and 48, this card, in passing the sensor 24, operated switch 24A to open contact 113, thereby deenergizing operating coil 118 of relay 119 which dropped out. Contact 114 was closed but without effect in view of open contact 155. When the card cleared the sensor 24 switch 24A reverted to its normal, illustrated position. This condition of a card at point 2*a* (FIGURE 14) in the delivery station 22 at the time the drum is stopped at its card return position 47 is indicated at operational block 175 in FIGURE 1. In this condition the selected card is opposite the withdrawal passage 46 in the position shown in FIGURE 10 and with the withdrawal hooks 82 at the ends of the arms 83 behind its projections 81. It is now desired to immediately withdraw the selected card in the path indicated by the dotted arrow in FIGURE 10.

When the card manipulator 74 in its innermost position closes contact 133, a circuit is made to energize the operating coil 146 of relay 139 from ground through coil 146, contact 133 now closed, contacts 110 and 121 and contact 105 to the hot line 102. Relay 139 now pulls in and closes contact 148 to energize motor M3 with reverse polarity from the battery 137 so that the motor rotates in reverse direction to move the card manipulator 74 outwardly. Closing of contact 147 forms a holding circuit about contact 133 which opens as the card manipulator 74 starts moving outwardly, contact 134 closing without effect since contact 142 is open. The selected card 25 is now withdrawn through the gate passage 46 in the path indicated by the dotted line in FIGURE 10 to the outermost X position provided for in the circuitry herein, where it may be left for readout or where a positioning X–Y mechanism, not shown nor forming a part of this invention, may take over to index the proper film image on the card in the optical system shown in FIGURE 11.

At the extreme outer movement of the card manipulator 74 contact 135 closes and contact 136 opens. Opening of contact 136 deenergizes operating coil 146 of relay 139 which drops out to deenergize and stop motor M3. This operation takes us through the operational block 176 in the diagram of FIGURE 1, and it is in this block that an X–Y positioning mechanism may be used to index a card image in the optical path, such an arrangement being optional and forming no part of the present invention.

The dropout of relay 139 closes contact 149 to establish a circuit to motor M2 through contacts 120, 111, 149, 144, 63 and 105 to the hot line 102. The motor M2 now rotates the cam group 69 to effect movements of the wedges 47 and 48 in the directions of the arrows 5 in FIGURE 4 to withdraw the wedges into the position shown in FIGURE 11, thereby opening limit switch contacts 110. At this point in the rotation of the cam group 69 the projection 71 operates switch 73 to momentarily close all of contacts 155, 157 and 159 thereby energizing all of coils 103, 108 and 118 to pull in the relays 104, 109 and 119. This deenergizes motor M2 which now stops in the position shown in FIGURE 3 which is the basic starting position for the cam group and the wedges 47, 48.

Figure 1:
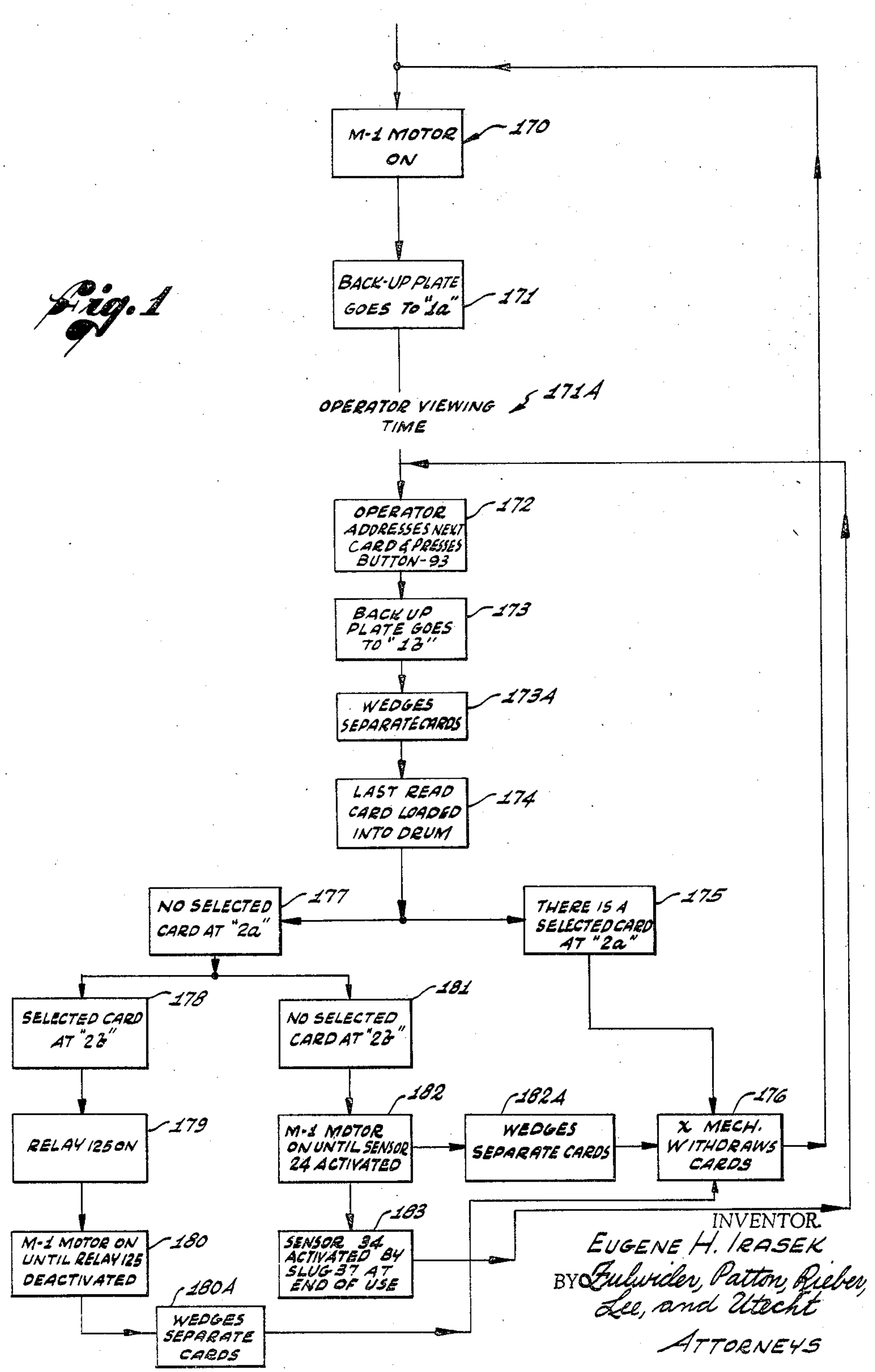
FIGURE 1 is a representation of the sequence of operation of the specific preferred embodiment of the invention illustrated in the other figures of the drawing.

Motor M1 is now energized through contacts 106 and 122 to rotate the drum 21 as indicated in the operational block 170 of FIGURE 1. The drum 21 rotates until magnetic slug 37 is detected by sensor 34 to open sensor switch 34A, thereby deenergizing operating coil 103 to drop out relay 104 and deenergize the motor M1, the drum 21 stopping in the position shown in FIGURE 13 with the backup plate 26 positioned at the upstream edge 1*a* of the selector device 23. The more frequently recalled and activity-oriented group of cards are in the area 3*a* where they will be first presented to the selector device 23 for immediate investigation of this group to see if a newly-addressed card is positioned therein. This last rotation of drum 21 carries through operational block 171 of FIGURE 1 and the system remains in this position during readout or other utilization of the selected card which has been withdrawn from the drum store. This period is indicated by the legend "Operator Viewing Time" at 171A but, as above explained, optical readout is but one of many optional ways of utilizing the card items in the store.

Returning to the operational chart of FIGURE 1, if after operational block 174 there is no selected card at gate position 2*a*, the flow path of operational block 175 is not used and instead the operation passes through block 177 where it divides into two possible conditions of a selected card being located or not being located at a position, designated 2*b* in FIGURES 13 and 14, opposite the sensor 24.

In either case, opening of contact 134 in the inner position of manipulator 74 deenergizes coil 141 and drops out relay 136. Closing of contact 144 energizes a circuit to motor M2 through contacts 120, 111, 149, 144, 163 and 105 to the hot line 102. Motor M2 therefore rotates the cam group 69 to move the wedges 47 and 48 outwardly in the directions of the arrows 5 of FIGURE 4 into the full line position of FIGURE 7, opening limit switch contacts 110. When the projection 71 which rotates with the cam group 69 operates switch 73, all of contacts 155, 157 and 159 are closed.

Taking first the condition where there is a selected card 25 opposite the sensor 24 the switch 24A will be in operated condition with contact 113 open and contact 114 closed. Opening of contact 113 deenergized coil 118 and dropped out relay 119 but the circuit through contact 121 was opened at contacts 110 so motor M3 is not energized. Closing of contact 114 sets up a circuit to coil 124 which is normally open at contact 155.

Closing of contacts 157 and 159 is without effect since contact 113 is open. Closing of contact 155 energizes coil 124 and closes relay 125 to close contact 126 for a holding circuit about contact 155. Contact 120 opens to deenergize motor M2 and stop the cam group 69 in the position of FIGURE 3, with the wedges 47 and 48 in their outward position as in FIGURE 11. Relay 125 closes contact 127 to energize motor M1 to rotate the drum 21 until the selected card clears the sensor 24 at which time sensor switch 24A reverts to its position shown in FIGURE 15, opening the circuit to operating coil 124 to drop out relay 125 and open contact 127 to deenergize motor M1. The drum 21 is braked to a stop and the selected card stops in the position shown in FIGURE 7 and at 2*a* in FIGURE 14, in the delivery and return station 22 opposite the passage 46 in the gate 41 with its projections 81 in front of the hook ends 82 on the card manipulator 74. These operations carry the device through operational blocks 178, 179 and 180 of the diagram of FIGURE 1.

Figures 4, 5, 6:
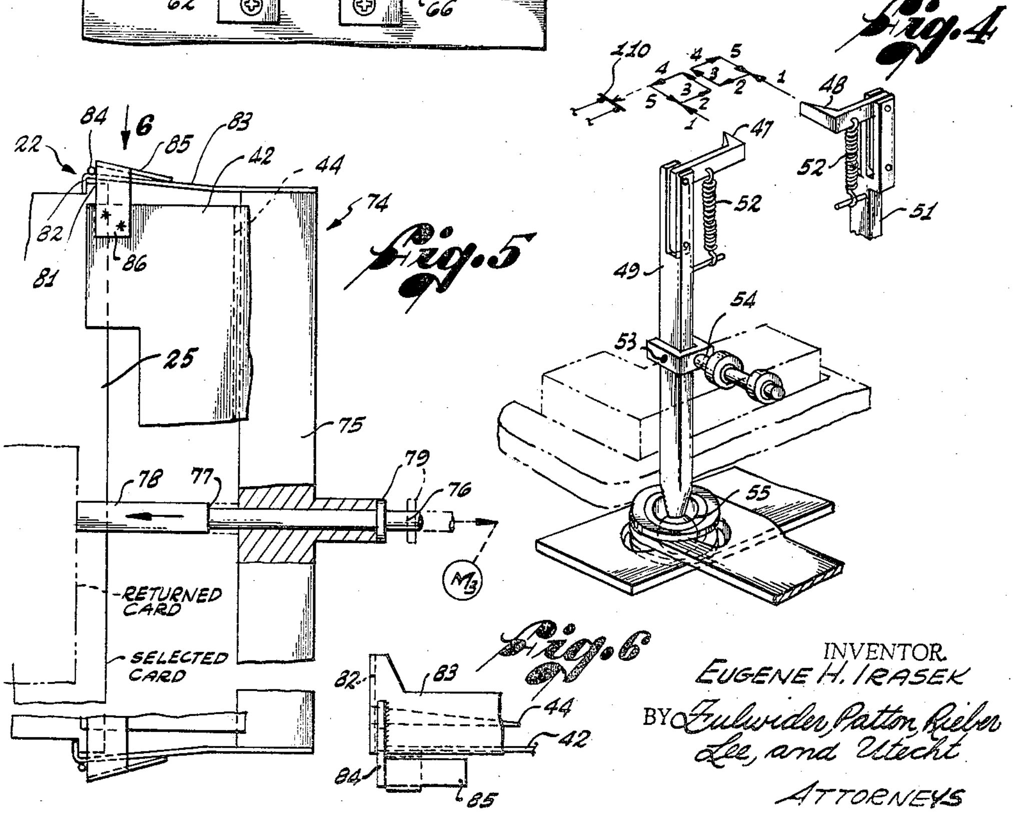
FIGURE 4 is a detailed view showing the card-separating elements and the motions given thereto by the mechanism of FIGURE 3.
FIGURE 5 is a detailed view showing the structure and operation of the card-removing and card-returning mechanism.
FIGURE 6 is a detailed view in the direction 6 of FIGURE 5.

When relay 125 dropped out contact 120 closed to energize motor M2 through contacts 120, 111, 149, 144, 163 and 105 to hot line 102, motor M2 rotates the cam group 69 to move the wedges 47, 48 in the successive directions of arrows 1 through 4 of FIGURE 4 to separate the cards on opposite sides of the selected card, as shown in FIGURES 7 through 10 and as explained in the above-identified copending application. This is the operation of block 180A and terminates with projection 71 operating switch 72 momentarily and wedge 47 closing limit switch contacts 110.

Opening of switch 163 deenergizes motor M2. Closing of switch 110 energizes operating coil 146 to pull in relay 139, opening contact 149 to open the circuit to motor M2 which was only momentarily opened at contact 163. Closing of contact 148 energizes motor M3 from battery 137 with a polarity to move the card manipulator 74 outwardly, pulling the selected card from the drum store as indicated by the dotted arrow in FIGURE 10. This completes operational block 176 of FIGURE 1 and after withdrawal of the card the drum 21 automatically returns to its position of FIGURE 13 through the operational blocks 170 and 171, as previously described.

Figure 7:
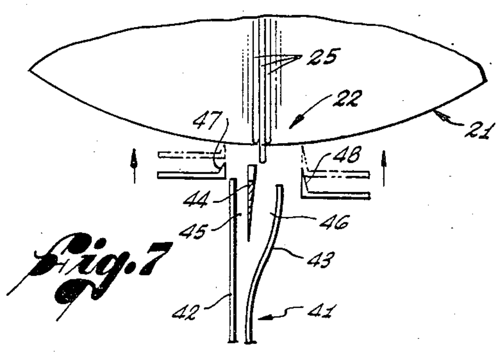
FIGURES 7 through 10 show various positions of the elements of FIGURE 4 in the withdrawal of a card from a store.
Figure 8:
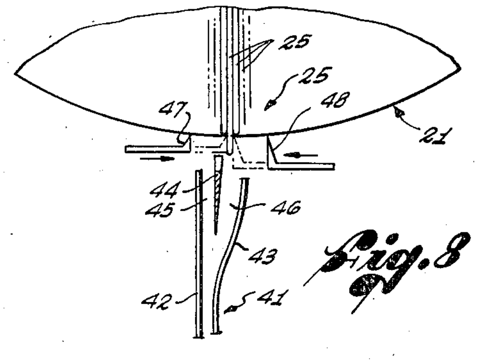
Figure 9:
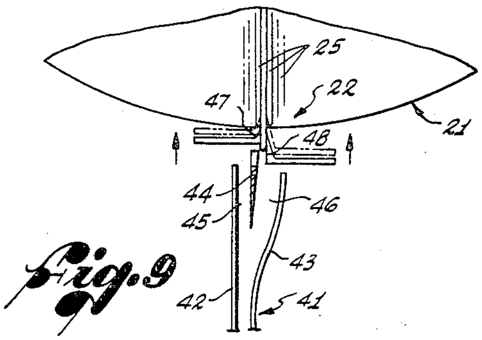

The operation diagram of FIGURE 1 contains an additional situation in which there is no selected card at either position 2*a* or 2*b* of FIGURE 14. This could mean that the selected card is still opposite the selector device 23 or anywhere else in the drum store upstream of the sensor 24. The operation block 174 in the diagram has been completed with card manipulator 74 in its full inward position and the wedges 47 and 48 inward and separated, with switch contacts 110 closed and contact 121 open. The operational flow is now through blocks 177 and 181 to operational block 182. In the inward position of card manipulator 74 contact 134 opens to deenergize coil 141 and drop out relay 138. This closes contact 144 to energize motor M2 through contacts 120, 111, 149, 144, 163, and 105 to the hot line 102. The motor M2 and the cam group 69 are at this time in a position with the projection 71 just past the switch 72. The motor M2 now rotates the cam group 69 to withdraw the wedges 47 and 48 directly outwardly into the dotted line position of FIGURE 12, opening limit switch contacts 110 and continuing until the projection 71 operates the switch 73 to momentarily close contacts 155, 157 and 159, thereby energizing the operating coils 103 and 108 of relays 104 and 109 which pull in to deenergize motor M2. The mechanism is stopped in the position shown in FIGURE 3 with the wedges 47 and 48 separated and withdrawn from the drum store as in dotted lines in FIGURE 12. With the closing of relay 104 a circuit is established for motor M1 through contacts 106 and 122 and M1 rotates the drum 21 until the card which is addressed by the plates 29 in the device 23 is selected thereby and partially withdrawn from the drum store by the magnets 31. When this card moves past the sensor 24, switch 24A opens contact 113 to deenergize operating coil 118 of relay 119 which drops out to open contact 122 and stop the motor M1 and drum 21 with the selected card opposite the withdrawal passage 46 in gate 41, as shown in FIGURE 7. This takes the operation through block 182 and the flow path follows through block 182A to separate the adjacent cards from the selected cards as shown in FIGURES 7 through 10 and as previously described for operational block 180A. The selected card is then withdrawn as described for operational block 176 and the drum 21 automatically returns to the position of FIGURE 13 through operational blocks 170, 171.

After the readout or other utilization period of 171A, the operator can address a new card by positioning the plates 29 in device 23 to the code identifying the desired card as indicated in block 172 and the sequence of operation repeated by again pressing the start button 93 to initiate a new cycle in which the withdrawn card is returned and the newly addressed and selected card withdrawn according to the operational flow path dictated by the location of the selected card at the time the drum is positioned to receive a card to be returned.

If it is desired to return a withdrawn card without withdrawing a new card, as at the termination of an overall operating period, the address plates 29 are left at the old positions identifying the withdrawn card and the start button switch 93 is closed. The operational cycle will follow the flow diagram through the block paths 172, 173, 173A, 174, 177, 181 through 182 to 183 where the drum terminates in the position of FIGURE 13, the same as after block 171. Since there was no card selected at device 23, sensor 24 was not activated and the drum 21 continued to rotate until sensor 34 was activated by magnetic slug 37 to open switch 34A, dropping out relay 104 and deenergizing motor M1. At this time the card manipulator 74 is in its inner position and it is desired that it be moved to its outer position where the original sequence of operation started. To effect this switch 160 is operated to disconnect hot line 102 and connect the supply line 161 to line 162. This energizes operating coil 146 of relay 139 which closes to energize motor M3 to rotate in the direction to move the card manipulator to its outer position remote from the drum 21 where contact 136 is opened to deenergize coil 146, dropping out relay 139 and deenergizing motor M3.

It will readily be seen that the random access storage and retrieval device of the present invention automatically concentrates and groups together at a predetermined location in the store those cards which are more frequently recalled from the store. The device automatically places these activity-oriented cards immediately adjacent the selector which selects an addressed card from the store so that the stored cards are first investigated at the location of the activity-oriented group with a strong probability of quick identification and selection of a card from within the group. Important savings in the time require for the retrieval operations are realized.

While a certain preferred embodiment of this invention has been specifically illustrated and described herein in accordance with the patent statutes and the rules of practice it will be understood that the invention is not limited thereto as many variations will be apparent to those skilled in the art.

I claim:

1. A random access storage and retrieval device for card-type items comprising:

storage means for holding a plurality of said items in side by side relation;

means at the forward edges of said items for uniquely identifying each of said items;

selector means adjacent the forward edge of said storage means for addressing said items in accordance with their unique identifying means;

means for effecting relative movement transversely of said items between said storage means and said selector means;

means at said selector means for selecting and partially withdrawing an addressed item from said storage means;

means providing a passage for withdrawing a selected item from said storage means;

means providing a passage for the return of a previously withdrawn item back into said storage means;

means for positioning the same predetermined location on said storage means opposite said return passage means for return of withdrawn items into the storage means at said predetermined location;

sensor means downstream of said selector means for detecting a partially withdrawn item and positioning it opposite said withdrawal passage means;

and item-manipulating means at said return passage means and withdrawal passage means.

2. The random access storage and retrieval device defined in claim 1 including:

means for positioning said predetermined location on said storage means at the upstream edge of said selector means in preparation for selection of a newly-addressed item.

3. The random access storage and retrieval device defined in claim 1 in which said return passage means and withdrawal passage means are adjacent to each other and said item-manipulating means is common thereto.

4. The random access storage and retrieval device defined in claim 1 including:

said return passage means and withdrawal passage means being adjacent to each other;

and separating means at said return passage and withdrawal passage means for entering the storage means to effect a space therein facilitating the return of items thereto and the withdrawal of items therefrom.

5. The random access storage and retrieval device defined in claim 4 including:

means for automatically operating said separating means to enter the storage means and effect a space therein each time said predetermined location on said storage means is positioned at said return passage means and each time a selected card is positioned at said withdrawal passage means.

6. The random access storage and retrieval device defined in claim 5 including:

means for automatically withdrawing said separating means out of said storage means, each time said storage means is to move relative to said selector means.

7. The random access storage and retrieval device defined in claim 2 in which said selector and passage-providing means are stationary and said storage means is movable relative thereto;

means automatically operating in sequence for moving said storage means relative to said selector means and passage-providing means, stopping said storage means with said predetermined location opposite said return passage means, operating said item-manipulating means to return a previously withdrawn item into said storage means, positioning an item selected by said selector means at said withdrawal passage means, operating said item-manipulating means to withdraw said selected item from said storage means;

and for moving said storage means to position said predetermined location at the upstream edge of said selector means in preparation for selection of a newly-addressed item.

8. The random access storage and retrieval device defined in claim 7 including:

separating means at said return passage means and withdrawal passage means for entering the storage means to effect a space therein;

means for actuating said separating means to enter and effect the space in the storage means each time an item is to be returned to and withdrawn from the storage means;

and means for withdrawing said separating means from said storage means, each time said storage means is to move relative to said selector and passage means.

9. The random access storage and retrieval device defined in claim 8 including:

means for operating said item-manipulating means to withdraw a selected item from the storage means immediately after return of a withdrawn item when a selected item is positioned at said withdrawal passage means at the time of positioning of said predetermined location on said storage means at said return passage means.

10. The random access storage and retrieval device defined in claim 8 including:

means for continuing the cycle to position a selected item at said withdrawal passage means should a selected item be located opposite said sensor means when said predetermined location on said storage means is positioned at the return passage means.

11. The random access storage and retrieval device defined in claim 2 including:

manual means for addressing an item by said selector means and for initiating a cycle of operation;

and automatic means for thereafter continuing the cycle of operation through withdrawal of the addressed item and the locating thereafter of said predetermined location on said storage means at the upstream edge of said selector means.

12. A random access storage and retrieval device for card-type items comprising:

storage means for holding a plurality of said items in side by side relation;

means at the forward edges of said items for uniquely identifying each of said items;

selector means adjacent the forward edge of said storage means for addressing said items in accordance with their unique identifying means;

means for moving said storage means transversely of said items relative to said selector means;

means at said selector means for selecting and partially withdrawing an addressed item from said storage means as an incident to the movement of said storage means past said selector means;

means for withdrawing said selected item from the storage means;

means for returning withdrawn items to the storage means at a predetermined location therein regardless of the location from which the item was withdrawn to thereby orient the more active items adjacent said predetermined location;

and means for automatically positioning said predetermined location on said storage means at the upstream edge of said selector means after withdrawal of the selected card from the storage means.

13. The random access storage and retrieval device defined in claim 12 including:

manually operable means for addressing an item at the selector means and for initiating movement of the storage means relative thereto;

and automatic means for thereafter sequentially returning a previously withdrawn card to the storage means at said predetermined location, withdrawing an item selected by said selector means from the storage means, and locating said predetemined location at the upstream edge of said selector means, whereby items grouped adjacent said predetermined location in the storage means by their activity will be first investigated by the selector means for the location of a newly-addressed item therein.

14. The random access storage and retrieval device defined in claim 13 including;

item withdrawal and item return stations located adjacent each other;

common means for returning a previously withdrawn card and withdrawing a newly-selected card at said stations;

means for stopping said storage means with said predetermined location at said return station;

means moving said item-manipulating means toward said storage means to return a previously withdrawn card thereto;

means moving a selected card to the delivery station; and means moving said manipulating means outwardly to withdraw the selected card from the storage means.

15. The random access storage and retrieval device defined in claim 14 including:

means operating automatically at the termination of the withdrawal stroke of the manipulating means for moving said storage means to locate said predetermined location at the upstream edge of the selector means in preparation for initial investigation by said selector means of the items oriented adjacent said predetermined location upon the initiation of a new cycle.

16. A random access storage and retrieval device defined in claim 14 including:

separating means at said withdrawal and return stations for entering the storage means to effect a space therein facilitating the return of items thereto and the withdrawal of items therefrom.

17. The random access storage and retrieval device defined in claim 16 including:

means for automatically operating said separating means to enter the storage means and open the space therein when said predetermined location on the storage means is positioned at said return station and when a selected card is positioned at said withdrawal station.

18. The random access storage and retrieval device defined in claim 17 including:

means for automatically withdrawing said separating means out of said storage means prior to movement of said storage means.

19. A random access storage and retrieval device for card-type items comprising:

storage means for holding a plurality of said items in side by side relation;

means on said items for uniquely identifying each of said items;

selector means associated with said storage means for addressing said items in accordance with their unique identifying means;

means for effecting relative movement transversely of said items between said storage means and said selector means to identify an addressed item;

means for withdrawing an item addressed and identified by said selector means from said storage means;

means for returning withdrawn items to the storage means at substantially the same location therein regardless of the locations from which the items were withdrawn;

and means automatically positioning said storage means and said selector means with said selector means located substantially adjacent the upstream side of said same location in the storage means to provide for initial sampling of the cards adjacent said same location upon relative movement between said storage means and said selector means.

20. The random access storage and delivery device defined in claim 19 in which:

said item-identifying means being located at the forward edges of the items;

said selector means being located adjacent to the forward edge of said storage means;

said selector means including address elements cooperating with the item-identifying means to identify and select an item addressed thereby for withdrawal from the storage means as an incident to the relative movement between the storage means and the selector means.

References Cited

UNITED STATES PATENTS

| | | | |
|---|---|---|---|
| 3,307,557 | 3/1967 | Shebanow | 209—80.5 |
| 3,308,830 | 3/1967 | Irasek | 209—80.5 |
| 3,312,225 | 4/1967 | Irwin | 209—80.5 |

M. HENSON WOOD, Jr., Primary Examiner